US005221250A

United States Patent [19]

Cheng

[11] Patent Number: 5,221,250

[45] Date of Patent: Jun. 22, 1993

[54] CODING OF MAXIMUM OPERATING SPEED ON CENTRIFUGE ROTORS AND DETECTION THEREOF

[75] Inventor: David W. Cheng, Union City, Calif.

[73] Assignee: Beckman Instruments, Inc., Fullerton, Calif.

[21] Appl. No.: 638,269

[22] Filed: Jan. 7, 1991

[51] Int. Cl.[5] ........................ B04B 13/00; B04B 9/10; G01P 3/487

[52] U.S. Cl. ........................................ 494/7; 494/10; 324/161; 324/166; 324/174; 318/163; 318/268; 388/924

[58] Field of Search ................................ 324/160–163, 324/166, 167, 173–175, 178–180, 207.14, 207.20, 207.22, 207.25; 318/254, 254 A, 138, 439, 268, 162, 163; 388/933, 924, 923, 811; 494/7, 10, 9, 11

[56] References Cited

U.S. PATENT DOCUMENTS

| | | | |
|---|---|---|---|
| 3,462,670 | 8/1969 | Waye | 318/327 |
| 3,480,207 | 11/1969 | Strohmaier | 324/163 X |
| 3,746,247 | 7/1973 | Camilliere | 23/1 B |
| 3,982,162 | 9/1976 | Olliffe | 388/811 |
| 4,205,261 | 5/1980 | Franklin | 318/480 |
| 4,450,391 | 5/1984 | Hara | 318/480 X |
| 4,551,715 | 11/1985 | Durbin | 340/671 |
| 4,700,117 | 10/1987 | Giebeler et al. | 318/327 |
| 4,772,254 | 9/1988 | Grassl et al. | 494/10 |
| 4,827,197 | 5/1989 | Giebeler | 318/3 |
| 4,847,555 | 7/1989 | Stammer et al. | 324/161 |

FOREIGN PATENT DOCUMENTS

| | | |
|---|---|---|
| 0226886 | 7/1987 | European Pat. Off. . |
| 0344443 | 12/1989 | European Pat. Off. . |
| 2559343 | 7/1977 | Fed. Rep. of Germany . |

OTHER PUBLICATIONS

Beckman Instruction Manual Model L8–60M; inside front page and p. 7, Sep., 1985.

*Primary Examiner*—Gerard R. Strecker
*Assistant Examiner*—Warren S. Edmonds
*Attorney, Agent, or Firm*—William H. May; P. R. Harder; Wen Liu

[57] ABSTRACT

A centrifuge rotor overspeed protection system which can operate with rotors of at least two speed ranges. A set of coding elements are provided on the rotors coded to represent the actual maximum safe speed rating of the rotor. An additional set of coding elements coded to correspond to the maximum speed in the lower speed range are also provided such that the rotor can be operated at the maximum speed possible in a prior art centrifuge designed for operation in the lower speed range. The detection circuit for the coding elements automatically adjusts the detection threshold depending on the average values of the sensor output peaks corresponding to the codes.

5 Claims, 3 Drawing Sheets

CODING OF MAXIMUM OPERATING SPEED ON CENTRIFUGE ROTORS AND DETECTION THEREOF

BACKGROUND OF THE INVENTION

1. Field of the Invention

The present invention relates to centrifuges and more particularly to an improved system for monitoring the actual speed and identifying maximum safe speed rating of a centrifuge rotor.

2. Description of Related Art

A centrifuge operation presents a unique set of design criteria where precision control of the rotational operation of the centrifuge is required. The wide variety of biological and chemical experimental research which use centrifugation as their primary tool to achieve component separation and perform experimental assays places a requirement of versatility on the operational characteristics which must be built into the centrifuge. At the same time, safety concerns have to be addressed.

The centrifuge rotor is driven to extremely high rotational speeds in order to generate the centrifugal field required for biological research use. The high rotational speeds of the rotor cause a severe build up of kinetic energy during operation, which if released (as when the rotor breaks into pieces while in rotation), can lead to destruction of the centrifuge and injury or damage to its surrounding environment as well as the human operator. Centrifuge rotors will fail if subject to excess stress under the high centrifuge field when the rotor is run in excess of the speed designed for its safe operation.

In order to make it possible to perform a variety of different kinds of separations, many centrifuges are designed so that they can operate with any of a variety of different kinds and sizes of rotors. The rotors can be interchangeably used in conjunction with the same centrifuge motor and drive shaft, each rotor having a different weight and strength of material and a different maximum safe speed above which the particular rotor should not be operated. Because failure of any rotor can be catastrophic, it is important that the centrifuges be able to determine the maximum safe speed of a rotor without having to rely upon the attentiveness of its operator.

Accurate control of the speed of a rotor also makes it important that a centrifuge include an accurate tachometer for generating a signal indicative of the actual speed of the rotor.

It is therefore clear that a versatile centrifugation system requires in part: (1) a maximum safe rotor speed be identified for each rotor; and (2) the operation of the rotor during centrifugation be monitored and controlled. As a result, some centrifuges are equipped with detection circuits to achieve these objectives. One such system is disclosed in U.S. Pat. No. 4,551,715 commonly assigned to the assignee of the present invention, which is hereby incorporated by reference. In the disclosed specification, a method of rotor identification and determination of the rotor's maximum safe speed is presented which relies on the detection of changing magnetic flux from magnetic coding elements to provide the necessary rotor identification and maximum safe speed information as well as actual rotor speed. Referring to FIGS. 1A and B, a single set of magnetic coding elements, e.g. permanent magnets 14 are imbedded in a circular array in the base 12 of the rotor 10. The permutation of the magnetic orientation of the magnets 14 is unique to the rotor model and provides positive identification of the rotor model. The transducer 16 is a Hall effect sensor which is used to detect the magnetic orientation of the permanent magnets 14. Magnets are also imbedded in the base of each model of interchangeable rotor designed for use with the centrifuge.

Specifically six magnets 14 are spaced at equal intervals in a circle and each is positioned to direct either a north-oriented or south-oriented magnetic field outward from the base 12 of the rotor 14 for detection by the Hall effect sensor 16. The sensor 16 detects a changing magnetic reluctance as the permanent magnets 14 rotate past the fixed sensor and induce a voltage in the sensor. A series of sharply defined voltage pulses of positive and negative polarity corresponding to north and south magnetic orientations, respectively, are generated by the sensor 16 and amplified in the detection circuit (not shown). The pulses represent the model of rotor used. Stored in the central processing unit (not shown) is an information listing identifying the maximum rated speed for each model of rotor. Once the rotor is identified on the basis of the pulses, the central processing unit reads the maximum speed rating information stored within its memory. The maximum permitted operation speed of the centrifuge is then set not to exceed the rated speed of the rotor. Thus the patent discloses an embodiment which is able to identify a rotor on the basis of a single transducer according to the combination of the north and south-oriented magnets 14 and the order that they pass the hall effect sensor 16.

The actual rotor speed can also be determined from the counting of the voltage pulses. For overspeed protection, the central processing unit is used to compare actual rotor speed with the maximum speed rating of the rotor. The central processing unit also is aware of what had been programmed at the operator keyboard for the desired acceleration and speed. The central processing unit functions to prevent the rotor from being actually operated beyond its intended rating even if a higher speed has been programmed.

As explained in the patent, the use of the coding scheme with a six-magnet array allows the detection circuitry to distinguish up to eleven different kinds of rotors. Stated differently, the coding scheme allows as many as eleven kinds of rotors, each with a different respective maximum safe speed, to be used with a particular centrifuge which incorporates the disclosed rotor identification technique. With the advent of new generation ultracentrifuges, additional rotors are designed for higher speed operations. It follows that the new ultracentrifuges will be able to accommodate rotors of higher speed ratings in addition to speed ratings of the eleven lower speed rotors. It is therefore desirable to design a system of rotor identification in new generation ultracentrifuges which will operate with a larger selection of rotors. It is also desirable to design the system to be compatible with prior art centrifuges and rotors.

SUMMARY OF THE INVENTION

The present invention is directed to an improved method and system of tachometer and rotor identification which is designed for use in new higher speed centrifuges to accommodate additional rotors of higher maximum speed ratings and which is compatible with the existing rotor identification information found on prior art rotors. The prior art rotors are compatible with the new higher speed centrifuges and the new higher speed rotors are compatible with the prior art centrifuges.

The present invention makes use of at least two sensors in the centrifuge for detecting rotor speed codes provided on the higher speed rotor at different radial distances from the axis of the rotor. The speed code at one radial distance corresponds to the highest maximum speed rating for the prior art rotors described in the background section. The second speed code at a different radial distances is used to provide information relating to the actual maximum speed rating of the rotor. When the new rotor is placed in operation in the new centrifuge having two sensors, one of the sensors detects the actual speed rating of the rotor and the other sensor detects the actual rotor speed. When the new rotor is placed in a prior art centrifuge having only one sensor, the maximum speed is set not to exceed the highest maximum speed rating provided by the first speed code. Hence, rotors with two speed codes can be used on prior art centrifuges having one sensor, as well as new higher speed centrifuges having two sensors. In addition, prior art rotors having only one speed code can also be detected by the sensor corresponding to the first speed code in the new centrifuges.

In another aspect of the present invention, the threshold for the detection of the codes is automatically adjusted according to the amplitude of the sensor output. This improves the detection dynamic range and the accuracy and reliability of the detection circuit.

DESCRIPTION OF ILLUSTRATED EMBODIMENTS

The following description is of the best presently contemplated mode of carrying out the invention. This description is made for the purpose of illustrating the general principles of the invention and should not be taken in a limiting sense. The scope of the invention is best determined by reference to the appended claims.

Figure 3:
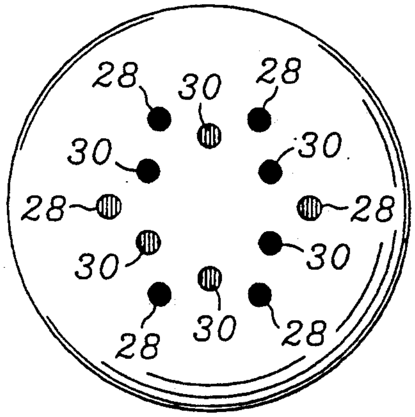
FIG. 3 the underside view of the rotor having magnetic coding configuration in accordance with one embodiment of the present invention.
Figure 2:
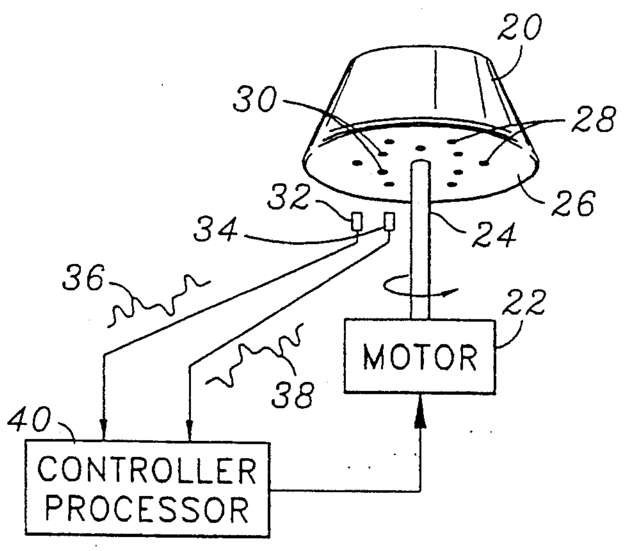
FIG. 2 is a schematic diagram of a centrifuge system which incorporates rotor identification and speed detection in accordance with one embodiment of the present invention.

Referring to FIG. 2, there is disclosed schematically a system by which information provided by the magnetic pulses detected from a rotating rotor 20 may be utilized to control a drive motor 22 and protect against overspeed. The motor 22 has a spindle shaft 24 upon which an individually selected rotor 20 may be affixed. The underside plan view of the rotor 20 is represented in FIG. 3 by a flat circular surface 26 having a plurality of magnets 28 and 30 imbedded therein. The configuration of the magnets will be discussed in detail below. Two Hall effect sensors 32 and 34 are disposed below the rotor 20 in functional relationship to the magnets. When driven by the motor 22, the magnets 28 and 30 revolves past the Hall effect sensors 32 and 34.

The operation of a Hall effect device is well known in the art. It is sufficed to briefly summarize its operation. A Hall effect sensor is sensitive to the direction of the magnetic field to which it is exposed, its output can be used to distinguish a north-oriented magnet from a south-oriented magnet. The sensor outputs a voltage signal in response to the detected magnetic field. More particularly, the output voltage of the sensor will increase (become more positive) with respect to a nominal value thereof when a north-oriented magnet passes by the sensor, and will decrease (becomes more negative) with respect to the nominal value thereof when a south-oriented magnet passes by the sensor. As a result, the output signal of the sensor is made up of a series of positive and negative pulses, the sequence of the pulses depending upon the sequence of the magnetic orientations of the magnets passing by the sensor.

As the pulses are time dependent, they can be used to determine the actual rotational speed of the rotor. In the example shown, a sequence of six pulses output by the sensor 34 represents one revolution of the rotor. Given the timing of the pulses, the rotation speed is easily determined by the processor/controller 40. As will be more fully explained below, the magnets 28 and 30 are arranged in a particular orientation to correspond to a maximum safe speed rating for the particular rotor. The output of the Hall effect sensors 32 and 34 can be used to identify the particular rotor and its maximum safe speed rating.

The output signals of the sensors 32 and 34 are input to a processor/controller 40 which uses the signals to identify the rotor 20 and its maximum safe speed rating and to determine the actual speed of the rotor 20 which may be used to control the motor 22 to regulate the speed of the rotor 20 not to exceed its maximum speed rating. The circuitry of the processor/controller 40 may be modified from that disclosed in U.S. Pat. No. 4,551,715 to Durbin, which has been assigned to the assignee of the present invention, and which has been incorporated by reference herein. It is noted that while the system in Durbin makes use of signal from one sensor, it can be easily modified to a two-sensor system given the disclosure of the desired function of the present invention. Additional modifications may be possible, see for example, U.S. Pat. No. 4,700,117 to Giebeler which also has been commonly assigned to the assignee of the present invention, and which is incorporated by reference herein.

Figure 4:
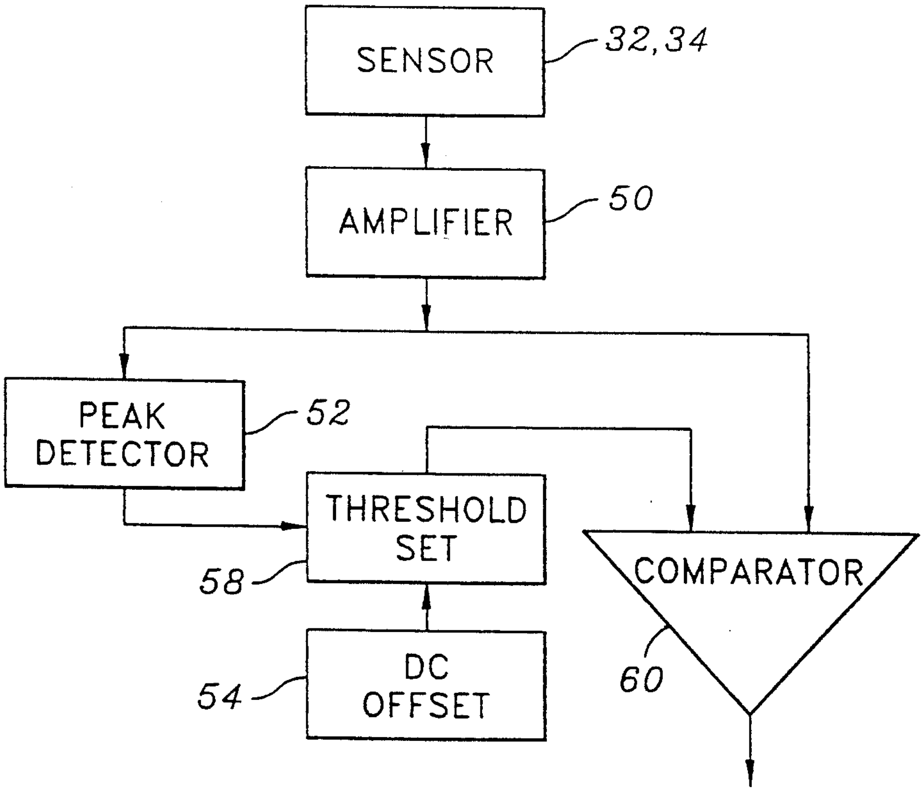
FIG. 4 is a functional block diagram of the pulse detection circuit in accordance with one embodiment of the present invention.

In addition to the prior art detection circuits, the present invention proposes an improved detection circuit which adjusts the threshold setting for the magnetic pulses. Specifically in prior art circuits, the magnetic pulse is detected to be present when the corresponding Hall sensor output voltage pulse exceeds a preset threshold level. In the present invention, the threshold level changes in a fixed relationship to the average of the detected amplitudes of the pulses. Referring to FIG. 4, the functional block diagram of the pulse detection circuit of the present invention is shown. The Hall sensor (32, 34) output voltage pulses are amplified by amplifier 50. The output of the amplifier 50 is monitored by a peak detector 52 which detects the peak of each pulse.

Upon detection of the peak of a pulse, the pulse detection threshold is set at functional block 58. To be more precise, because of the inherent time delay in the detection circuit which typically comprises resistance-capacitance network, the peaks of several pulses are inherently averaged for determination of the threshold setting. The threshold is set by the user at a predetermined percentage of the average peak level of the pulses. This percentage is chosen with due consideration of the detection dynamic range desired, the expected amplitude of the pulses, and the gain of the amplifier. Once the threshold is set, the amplified signal from the amplifier 50 is compared to the threshold at comparator 60. The pulse is detected as the signal exceeds the threshold. The threshold is changed as the average peak value of the pulses changes.

A DC offset 54 is provided to apply a fixed DC offset to mask out background noise. The effect of the DC offset is to ensure no output from the comparator 60 when the rotor has come to a complete stop. Without the DC offset, the background noise in the circuit could cause the threshold to be set at close to zero value to result in the false reading of a detected pulse by the comparator 60 (thus a false indication that the rotor is still spinning) in the presence of noise in the inputs to the comparator 60.

The above described detection circuit by controlling the setting of the threshold will detect pulses over a wider dynamic range. Whereas in prior art circuit, a pulse may be missed if the amplitude of the pulse is below the preset threshold. The amplitudes of the pulses can change due to several reasons. It has been found that the amplitudes of the Hall sensor pulses decrease with increase in rotor speed. Another reason is that during rotation of the rotor, the motor spindle may bend thus varying the distance between the magnets and the Hall sensor and affecting the amplitudes (which decrease significantly with increase in distance) of the pulses. Also, although different models of rotors are designed to be interchangeable, there may be slight but noticeable variation in the distance between the magnets on the base of the rotors and the Hall sensor. Moreover, the field strength of the magnets for the different rotors may not be the same due to variations in manufacture of the magnets.

The configuration of the magnets on the base of the rotor and the coding scheme will now be described. Referring to FIG. 3, the bottom view of the rotor 20 having magnets 28 and 30 configured in accordance with the present invention is shown. The magnets are imbedded flush with the base 26 of the rotor 20. These magnets 28 and 30 each have a north-south magnetic orientation that is generally perpendicular to the rotor base 26. For convenience of illustration, the north poles are shaded and the south poles are cross-hatched. The magnets 28 and 30 are arranged in two concentric circles centered about the axis of the rotor. On each circle, the magnets are spaced at equal angular intervals. Preferably, the two circles of magnets are angularly staggered as shown in FIG. 3. This is to avoid interference between adjacent magnets on the two circles if they were positioned along the same axis. When the rotor rotates, each circle of magnets pass by the respective Hall effect sensor 32 and 34. It will be understood that the total number of magnets in each circle may be larger or smaller than six, depending upon the particular number of coding variations desired and the geometry of the rotor base.

As is discussed in U.S. Pat. No. 4,551,715, the maximum number of rotor speed codes that can be obtained with a circle of six magnets is eleven using a circuitry that can identify north and south-oriented magnets as well as each transition from north to south orientations. The eleven possible codes include the two configurations in which either all the north poles or all the south poles are facing the sensor. In the present invention, it is however recommended that such two configurations not be used.

Figure 1A:
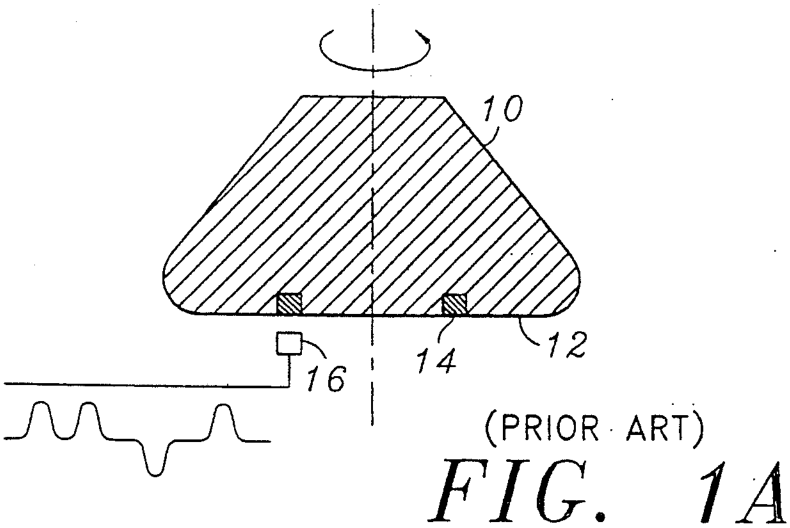
(PRIOR ART) FIG. 1A
FIG. 1A is a sectional view of a prior art centrifuge rotor having magnetic speed detection and rotor identification elements.
Figure 1B:
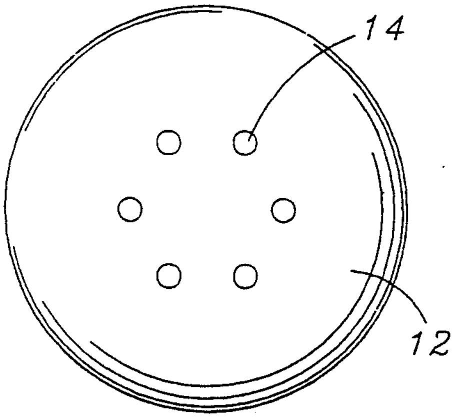
(PRIOR ART) FIG. 1B
FIG. 1B is the underside view of the rotor in FIG. 1A.

For convenience of description of the coding scheme of the present invention, let the maximum speed rating for a prior art centrifuge be 100,000 rpm. A series of prior art rotors have been designed to operate in such centrifuge at various maximum safe speeds up to 100,000 rpm. As explained in the background section, in the past, one circle of magnets have been used to identify the series of rotors. A new generation of centrifuges (hereinafter "new centrifuges") are now being designed for operation at greater than 100,000 rpm. Thus, the second circle of magnets in the present invention will encode additional speed rating information on the rotors designed for use in the new centrifuges. Specifically, the inner circle of magnets 30 are configured to correspond to the maximum permitted speed for the prior art centrifuge i.e. 100,000 rpm. The radial distance of the magnets 30 is the same as the magnets 14 in the prior art rotor 10 (FIG. 1A). The outer circle of magnets 28 are configured to correspond to the actual maximum safe speed rating of the rotor 20.

When this rotor 20 is placed in operation in a new centrifuge which is equipped with dual sensors 32 and 34, the outer sensor 32 detects that a second circle of magnets are present indicating that the rotor in use is not a prior art rotor. Thereafter, the sensor 34 closest to the axis detects the speed at which the rotor 20 is spinning as represented by the timing of the magnetic pulses from magnets 30. The sensor 32 detects the actual speed rating code of the rotor 20.

When a prior art rotor designed for 100,000 rpm or less (rotor 10 in FIG. 1A) is used in the new centrifuge, since there is only one circle of magnets, i.e. magnets 14 in FIG. 1A, no signal will be detected by the outer sensor 32. The centrifuge will set the maximum permitted speed according to the rotor speed code received from the inner sensor 34. On the other hand, when a rotor 20 rated for more than 100,000 rpm is used in the new centrifuge, both sensors 32 and 34 will receive signals and the centrifuge will set the maximum permitted speed according to the rotor speed code received by the outer sensor 32.

The situation when the rotor 20 is used in the prior art centrifuge is now considered. When the rotor 20 is placed in operation in a prior art centrifuge, which operates up to 100,000 rpm, and which is equipped with one sensor 16 (see FIG. 1A), the sensor 16 will read from the inner circle of magnets 34 the rotor speed code (100,000 rpm) and the actual rotation speed. Since the prior art centrifuge has only one sensor 16 (FIG. 1A) and the rotor speed code represented by the inner circle of magnets 30 on the rotor 20 is 100,000 rpm, the prior art centrifuge will allow the rotor 20 to spin to at most 100,000 rpm. The operation of prior art rotors in the prior art centrifuge will depend on the actual maximum speed rating coded on the rotors.

Figure 5:
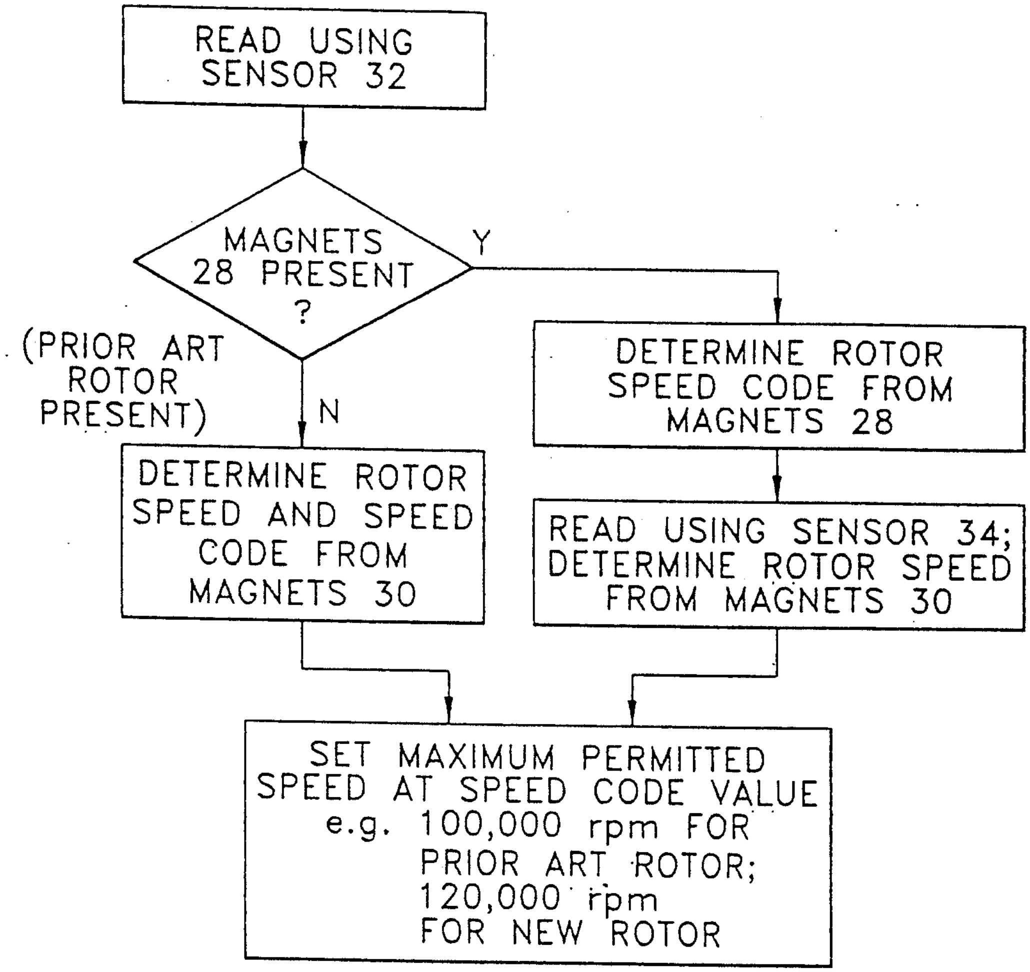
FIG. 5 is a flow chart illustrating the maximum safe speed setting control in the centrifuge in accordance with the present invention.
Figure 6:
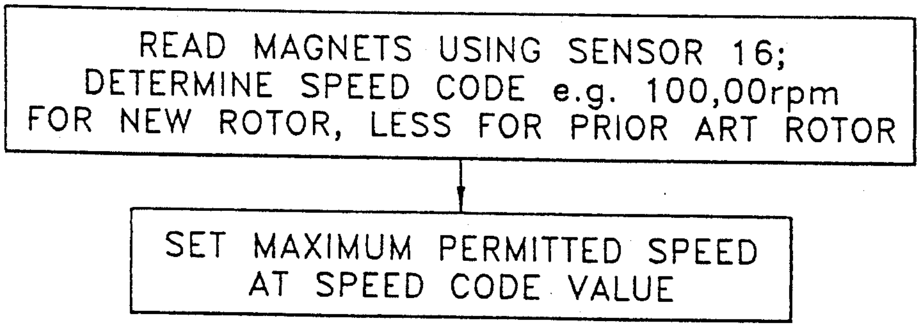
FIG. 6 is a flow chart illustrating the maximum safe speed setting control in prior art centrifuges.

The centrifuge controls are summarized in FIGS. 5 and 6 for rotor operations in the new centrifuge and prior art centrifuge.

In summary, with the new two-sensor system, all low speed series (less than 100,000 rpm) rotors can be used in both the prior art and new centrifuges without reduction in performance. Similarly, all high speed series (greater than 100,000 rpm) rotors can be used in both the prior art and new centrifuges either at the actual maximum permitted speed of the rotor (when operated in a new centrifuge) or at the maximum speed (i.e. 100,000rpm) rating of the centrifuge (when operated in a prior art centrifuge). Thus the rotor can be operated at the highest speed that the rotor or centrifuge can bear thus obtaining the highest centrifuge field possible.

While the present invention has been described in reference to two circles of magnets on the rotor, by changing the radial distance of the sensors and magnets, and/or the number of sensors in connection with a corresponding number of circles of magnets, an unlimited number of rotor speed codes could be developed for use on rotors that are compatible for use in different speed centrifuges.

While the above described embodiment uses magnetic coding elements, the practice of the present invention is not limited to use with such elements. The invention could, for example, be practiced with optically readable coding elements and an optical detector. In such an embodiment, the coding array would include a circular track having coding elements that can be distinguished into one or two types on the basis of whether their reflectivity is greater or less than that of the part of the track that is located between the coding elements. Because of the tendency of the output of such an array to be affected by dirt and scratches, however, such embodiments are not preferred embodiments of the present invention.

While the invention has been described with respect to the preferred embodiment in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

We claim:

1. A centrifuge rotor compatible for use in first and second centrifuges in which the rotor has different maximum operating speeds, the rotor comprising:

a body configured for holding a sample for centrifuging about an axis;

a first set of detectable coding elements provided on the body and arranged at a first radius about the axis, said first set defining a first code which corresponds to a first maximum operating speed of the rotor in a first centrifuge; and a second set of detectable coding elements provided on the body and arranged at a second radius about the axis said second set defining a second code which corresponds to a second maximum operating speed of the rotor that is higher than the first maximum operating speed for operation in a second centrifuge, whereby at least one of the first or second set of coding elements are detected to obtain the first or second code to determine a maximum operating speed at which the rotor can be operated depending on whether it is placed in operation in the first or second centrifuge.

2. A centrifuge rotor as in claim 1 wherein the second set of coding elements are magnets attached to the rotor and are configured in a manner which defines the second code.

3. A centrifuge rotor as in claim 2 wherein the magnets are arranged in a manner such that the sequence of the north-south orientations of the magnets defines the second code.

4. A centrifuge rotor a in claim 3 wherein the magnets are arranged at equal angular intervals about the axis.

5. A centrifuge rotor as in claim 1 wherein the first and second sets of coding elements are arranged in concentric circular arrays about the axis.

* * * * *